(12) United States Patent
Heitmann et al.

(10) Patent No.: US 12,185,669 B2
(45) Date of Patent: Jan. 7, 2025

(54) FORAGE HARVESTER

(71) Applicant: CLAAS Selbstfahrende Erntemaschinen GmbH, Harsewinkel (DE)

(72) Inventors: Christoph Heitmann, Warendorf (DE); Sven Carsten Belau, Gütersloh (DE); Ingo Bönig, Gütersloh (DE); Frédéric Fischer, Arnsberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 723 days.

(21) Appl. No.: 17/405,827

(22) Filed: Aug. 18, 2021

(65) Prior Publication Data
US 2022/0061215 A1 Mar. 3, 2022

(30) Foreign Application Priority Data
Aug. 25, 2020 (DE) .......................... 102020122202.5

(51) Int. Cl.
*A01D 41/127* (2006.01)
*A01D 43/08* (2006.01)

(52) U.S. Cl.
CPC ....... *A01D 43/085* (2013.01); *A01D 41/1274* (2013.01); *A01D 41/1277* (2013.01)

(58) Field of Classification Search
CPC .............. A01D 41/127; A01D 41/1274; A01D 41/1276; A01D 41/1277; A01D 43/085;
(Continued)

(56) References Cited

U.S. PATENT DOCUMENTS 7,804,588 B2 * 9/2010 Kormann ........... A01D 41/1277
356/634
10,085,379 B2 * 10/2018 Schleusner ............. G01S 17/89
(Continued)

FOREIGN PATENT DOCUMENTS

DE 102012207591 B3 10/2013
EP 1486769 A2 12/2004
(Continued)

OTHER PUBLICATIONS

European Search Report for European application No. 21181160.9-1004 mailed Dec. 7, 2021.

*Primary Examiner* — Thomas B Will
*Assistant Examiner* — Robert E Pezzuto
(74) *Attorney, Agent, or Firm* — Lempia Summerfield Katz LLC

(57) ABSTRACT

A forage harvester. The forage harvester has a work assembly for harvesting a crop and for processing harvested material of the crop, which includes grain components and non-grain components. In operation, the harvested material is transported in a harvested material flow along a harvested material transport path through the harvesting machine. The forage harvester also has a control assembly that includes an optical measuring system arranged on the harvested material transport path. The optical measuring system has a camera for recording image data of the harvested material of the harvested material flow. The control assembly, using an image recognition routine, determines image regions assigned to a non-grain component in the image data, determines geometric properties of the assigned non-grain components based on the image regions, and determines an indicator of a structural percentage of the harvested material from the geometric properties.

20 Claims, 2 Drawing Sheets

(58) Field of Classification Search
CPC .... A01D 43/087; A01D 43/102; A01D 90/02; G06T 7/0002; G01N 15/1431; G01N 15/0227; G01N 15/1433; G01N 21/85; G01N 21/3563

See application file for complete search history.

(56) References Cited

U.S. PATENT DOCUMENTS

| | | |
|---|---|---|
| 2005/0102079 A1 | 5/2005 | Hofer et al. |
| 2006/0191251 A1 | 8/2006 | Pirro et al. |
| 2011/0169950 A1* | 7/2011 | Weaver .............. G08B 13/1966 348/143 |
| 2012/0123650 A1 | 5/2012 | Diekhans et al. |
| 2016/0029561 A1 | 2/2016 | Fischer et al. |
| 2019/0340749 A1 | 11/2019 | Schwartzer et al. |
| 2022/0022375 A1* | 1/2022 | Murray ................ A01D 41/127 |

FOREIGN PATENT DOCUMENTS

| | | |
|---|---|---|
| EP | 1671530 A1 | 6/2006 |
| EP | 2452550 A1 | 5/2012 |
| GB | 2557469 A | 6/2018 |

\* cited by examiner

FORAGE HARVESTER

CROSS REFERENCE TO RELATED APPLICATION

This application claims priority under 35 U.S.C. § 119 to German Patent Application No. DE 102020122202.5 filed Aug. 25, 2020, the entire disclosure of which is hereby incorporated by reference herein.

TECHNICAL FIELD

The invention relates to a forage harvester that includes an optical measuring system and a control assembly.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Forage harvesters harvest a crop from a field and process the harvested material obtained by using a series of work assemblies. One area of application of foraging harvesters is the harvesting of corn. With this type of harvesting, frequently the entire corn plant including the corncob is collected and chopped up using the forage harvester. The harvested material obtained in this manner may be used to feed livestock, especially ruminants. An alternative possible usage is in biogas plants.

When the harvested material is used as feed for ruminants, value is increasingly being placed on a structural percentage of the chopped harvested material. In particular, ruminants who eat harvested material that is too finely chopped up may contract subacute rumen acidosis. Rumen acidosis is the acidification of the rumen. Rumen acidosis may be prevented by stimulating the masticatory activity of the ruminant. The saliva that this produces buffers the acid in the rumen and prevents acidification. To stimulate the masticatory activity of the ruminant, the chopped up harvested material may need to contain non-grain components (e.g., those components of the plant, such as the corn plant, which are not grains that exceed a predetermined minimum size). These non-grain components are termed structurally effective and form the structural percentage of the harvested material. Strictly speaking, the structural percentage may be conventionally determined at least by the chemically determinable percentage of neutral detergent fibers in the non-grain components with a physically effective minimum size. The percentage of non-grain components with this physically effective minimum size may, in turn, be determined by a sifting procedure. The structural percentage of the harvested material may accordingly be depicted by the percentage of physically effective neutral detergent fibers (peNDF).

A forage harvester, disclosed in US Patent Application Publication No. 2016/0029561 A1, incorporated by reference herein in its entirety, includes at least one work assembly for harvesting a crop and processing harvested material of the crop. While the forage harvester is operating, the harvested material (comprising grain components and non-grain components) is transported in a harvested material flow through the field harvester along a harvested material transport path. The forage harvester also has a control assembly that includes an optical measuring system arranged on the harvested material transport path. The optical measuring system has a camera for recording image data of the harvested material of the harvested material flow. By using this image data, the grain components may be divided into comminuted and non-comminuted grain components in order to thereby optimize the operation of the forage harvester.

BRIEF DESCRIPTION OF THE FIGURES

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
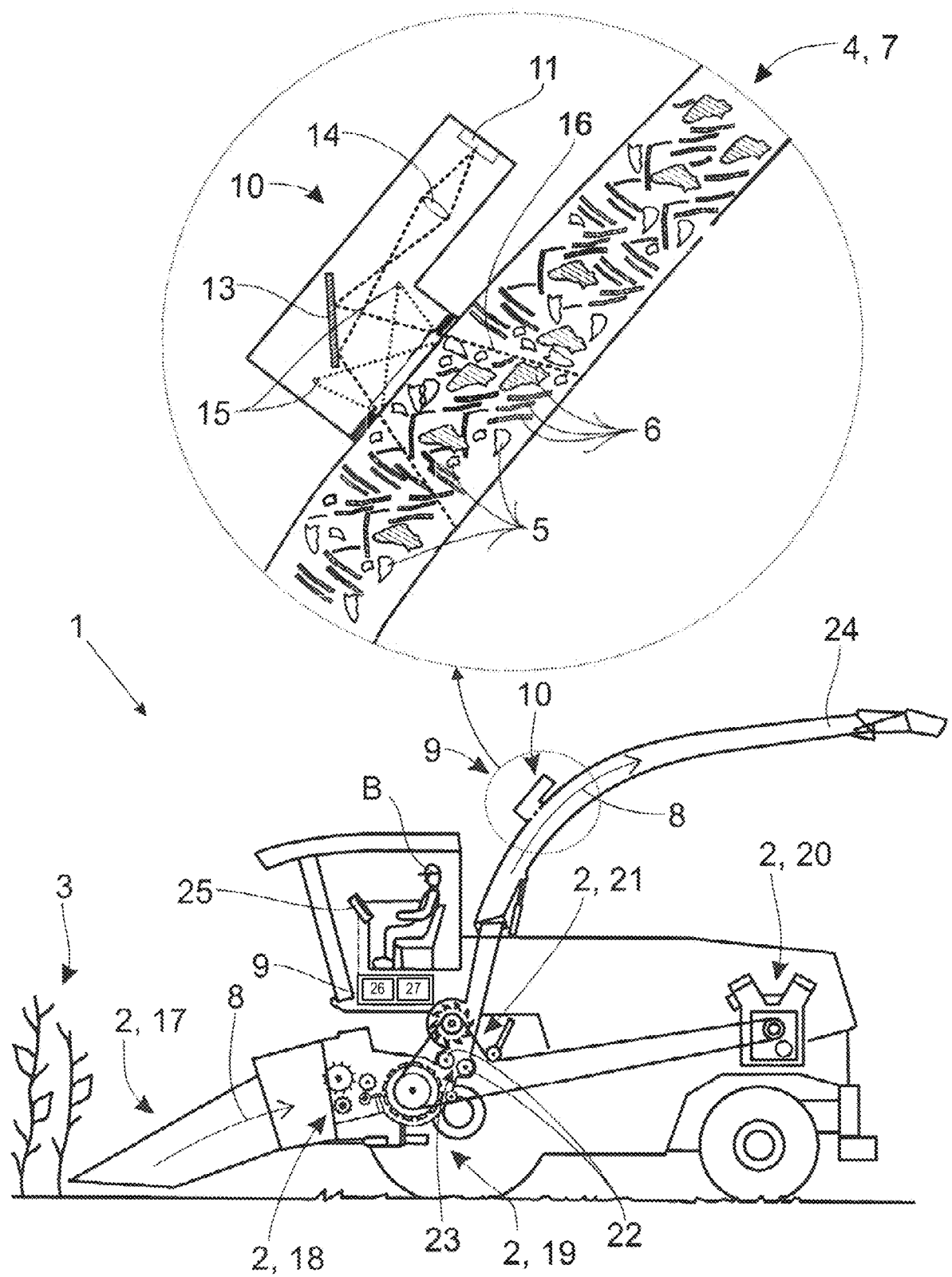
FIG. 1 illustrates a proposed forage harvester with a control assembly that schematically shows the recording of the harvested material by means of the optical measuring system.

As discussed in the background, one method to determine the percentage of non-grain components is by sifting or chemical analysis. However, sifting and chemical analysis of harvested material is time-consuming, possibly imprecise, and may not be performed while harvesting.

Further, typically, the non-grain components are not analyzed during operation of the forage harvester. Therefore, there is a need to simplify the determination of the structural percentage of the harvested material.

Thus, in one or some embodiments, a forage harvester is disclosed which is configured to improve or optimize the determination of the structural percentage.

In one or some embodiments, the harvester may include at least one work assembly for harvesting a crop and/or for processing harvested material of the crop. Further, one or more prerequisites are contemplated. For example, the results of a sifting process may be predicted with a sufficient tolerance while optically viewing the harvested material. Further, the percentage of neutral detergent fibers in the non-grain components may be considered a more-or-less constant percentage. Under these prerequisites, an indicator of the structural percentage of the harvested material may be determined by image recognition, namely by determining the geometric properties of non-grain components via image recognition and in turn determining the structural percentage of the harvested material. Using this indicator of the structural percentage of the harvested material, the forage harvester may perform one or more actions in order to influence (such as modify) the structural percentage of the chopped up harvested material even while the forage harvester performs harvesting.

In particular, the control assembly may be configured to determine image regions assigned to a non-grain component in the image data in an image recognition routine by using an image recognition algorithm. Further, the control assembly may be configured to determine geometric properties of the assigned non-grain components in the image recognition routine based on the particular image regions, and the control assembly may be configured to determine an indicator of a structural percentage of the harvested material in the image recognition routine from the geometric properties according to predetermined calculation instructions.

Grain components and non-grain components may be differentiated with varying effectiveness in an optical analysis with different wavelengths of the recorded light. The recognition of the geometric properties may also depend on the wavelength. In one or some embodiments, the camera may comprise a multi-spectral camera, such as a multi-spectral camera that records light from at least three distinguishable wavelength ranges, at least four distinguishable wavelength ranges, at least five distinguishable wavelength ranges, and/or the multi-spectral camera may record light from at most 15 distinguishable wavelength ranges, at most ten distinguishable wavelength ranges, or at most eight distinguishable wavelength ranges. Alternatively, the camera may comprise a hyperspectral camera, such as a hyperspectral camera that records light from at least 50 distinguishable wavelength ranges, at least 80 distinguishable wavelength ranges, or at least 150 distinguishable wavelength ranges. In one or some embodiments, the camera may record visible light and infrared light, such as near infrared light, from different wavelength ranges, so that the camera records at least one red wavelength range, and/or at least one green wavelength range, and/or at least one blue wavelength range. In one or some embodiments, infrared light may be well-suited for differentiating between grain components and non-grain components.

Instead of a multi-spectral camera or hyperspectral camera, an RGB camera may also be combined with an IR camera. Thus, a combination of the multi-spectral camera or hyperspectral camera with an RGB camera may also be used. Specifically, the optical measuring system may additionally have an IR camera that records infrared light, such as a near infrared (NIR) camera that records near infrared light, for recording IR image data of the harvested material in a section of the harvested material flow, such that the image data are RGB image data. Further, the optical measuring system may record infrared (IR) image data of the harvested material in the measuring routine using the IR camera, and may determine the indicator for the structural percentage from the RGB image data and the IR image data in the image recognition routine.

In one or some embodiments, the camera and/or the additional IR camera may have basically only optical sensor elements based on silicon, or based on indium-gallium-arsenide.

To improve the determination of the geometric properties and the image regions that are assigned to the non-grain components, in one or some embodiments, the image recognition algorithm may be based on machine learning, such as deep learning.

In one or some embodiments, the geometric properties may include geometric dimensions of the non-grain components, such as the geometric dimensions including any one, any combination, or all of: a shortest side length; a greatest side length; or a cross-sectional area. The indicator of the structural percentage may thus depict a percentage of non-grain components with predetermined geometric properties of the harvested material or the non-grain components, and the calculation instructions may include a formation of the percentage, such as the indicator of the structural percentage depicting a percentage of predetermined non-grain components, recognized via the image recognition algorithm, with predetermined geometric properties of the harvested material or the non-grain components. Their purpose may therefore be to replicate the actual structural percentage of the harvested material as precisely as possible.

In one or some embodiments, the work assemblies of the forage harvester may be at least partly adjusted by using machine parameters, such as a work assembly. Various work assemblies are contemplated. In one or some embodiments, the forage harvester has any one, any combination, or all of: an attachment generating harvested material flow for collecting the crop; a pre-pressing roller as a work assembly arranged or positioned in the harvested material flow with a rotational speed through which a chaff length of the harvested material may be adjusted; a cutterhead as a work assembly that is arranged or positioned in the harvested material flow for chopping the harvested material; or a corn cracker as a work assembly arranged or positioned in the harvested material flow, such as the corn cracker having two rollers that rotate during operation with an adjustable rotational speed as a machine parameter, with the harvested material flow running through a gap with a gap width between the rollers that is adjustable as a machine parameter, and the rollers having a differential rotational speed that may be adjusted as a machine parameter by which the rotational speed of the rollers differs.

In one or some embodiments, the camera and/or the IR camera may be arranged along the harvested material transport path behind the corn cracker such that the camera is arranged or positioned on a discharge chute of the forage harvester. In this way, the processing of the harvested material with the corn cracker may be substantially completed, so that it may be advantageous to position the camera after the corn cracker.

In one or some embodiments, the indicator of the structural percentage may be displayed to a user, such as an operator of the forage harvester. In this way, the user may specify via an input a value of the indicator for a structural percentage to be achieved, and/or a minimum value, and/or a maximum value. In turn, at least a part of the forage harvester, such as the control assembly, may compare the determined value of the indicator for the structure percentage with the value input by the user, and based on the comparison modify operation of at least a part of the forage harvester, thereby adapting operation to comply with the user specified value (e.g., modify the determined value of the indicator to be closer to the value of the indicator input by the user). In particular, the user may transmit his/her target specifications to the forage harvester and have the forage harvester modify operation in order to adjust the structural percentage (e.g., to optimize of the structural percentage). For example, the control assembly may optimally adjust one or more machine parameters, such as one or more machine parameters of the forage harvester that affect the structural percentage, of at least a part of the forage harvester, such as the pre-pressing roller. Example machine parameters include any one, any combination, or all of: rotational speed of the pre-pressing roller; gap width of the corn cracker; differential rotational speed of the corn cracker; or rotational speed of the rollers of the corn cracker. Other machine parameters are contemplated. Various improvements or optimization goals are contemplated. For example, the optimization goal may comprise a predetermined structural percentage and/or a predetermined (such as a minimum) fuel consumption. In particular, example predetermined structural percentages may comprise a percentage of at least 14.8% and at most 18% of non-grain components with a non-strainable cross-section of 8 mm.

In one or some embodiments, the control assembly may automatically regulate the machine parameter to reach the optimization goal, such as the control assembly adjusting different settings of the machine parameter successively in an optimization routine in order to determine a dependency between the machine parameter and the indicator of the structural percentage, and the control assembly may then, based on the determined dependency, optimally regulate the machine parameter automatically with respect to the optimization goal. In particular, the control assembly may adjust different settings of the one or more machine parameters and determine the indicators of the structural percentage responsive to the adjusting different settings of the one or more machine parameters. In turn, the control assembly may determine, based on adjusting different settings of the one or more machine parameters and the determined indicators of the structural percentage responsive to the adjusting different settings of the one or more machine parameters, a dependency between the one or more machine parameters and the indicator of the structural percentage. Finally, the control assembly may adjust the one or more machine parameters that affect the structural percentage by automatically regulating, based on the determined dependency, the one or more machine parameters with respect to the optimization goal.

Referring to the figures, the forage harvester 1 shown in FIG. 1 has at least one work assembly 2 for harvesting a crop 3 and/or for processing harvested material 4 of the crop 3. In one or some embodiments, the crop 3 is corn plants. In operation, the forage harvester 1 harvests the crop 3. Alternatively, the forage harvester 1 may also only pick up crop 3 that has already been harvested. The crop 3 obtained in this manner may then be processed by the forage harvester 1, such as chopped up.

In one or some embodiments, the harvested material 4 comprises grain components 5 and non-grain components 6. The grain components 5 may be corn grains from the corn plants. The non-grain components 6 may be leaves, stems and the like from the corn plant.

While the forage harvester 1 is operating, the harvested material 4 is transported in a harvested material flow 7 along a harvested material transport path 8 through the forage harvester 1. As may be seen in the enlargement in FIG. 1, the grain components 5 and the non-grain components 6 are mixed together in the harvested material flow 7. The harvested material transport path 8 is suggested in FIG. 1. The harvested material transport path 8 runs in a typical manner through the forage harvester 1. The harvested material flow 7 may be divided in the forage harvester 1 into a main harvested material flow and smaller partial harvested material flow(s). All statements with respect to the harvested material flow 7 may correspondingly refer to the main harvested material flow and/or to partial harvested material flow(s).

The forage harvester 1 has a control assembly 9 that has an optical measuring system 10 arranged or positioned on the harvested material transport path 8. The optical measuring system 10 has a camera 11 for recording image data of the harvested material 4 of the harvested material flow 7. The term "camera" includes any optical sensors that may record spatially resolved image data. The term "spatially resolved" may include details of the harvested material 4 that may be distinguished in the image data. In one or some embodiments, a pure spectrometer that, for example, only records one pixel does not fall under the term "camera". The camera 11 therefore has at least a sufficient number of pixels to enable the disclosed image recognition as explained further below.

The optical measuring system 10 records image data of the harvested material 4 in a measuring routine using the camera. This measuring routine may correspondingly be performed while the forage harvest 1 is operating.

In one or some embodiments, using an image recognition algorithm, the control assembly 9 is configured to determine one or more image regions 12 in the image data that are each assigned to a non-grain component 6 during an image recognition routine. The control assembly 9 may comprise any type of computing functionality, such as at least one processor 26 (which may comprise a microprocessor, controller, PLA, or the like) and at least one memory 27 in order to perform the disclosed image recognition, the processing to determine the indicator of the structural percentage, and/or any other processing disclosed herein. The memory may comprise any type of storage device (e.g., any type of memory). Though the processor 26 and memory 27 are depicted as separate elements, they may be part of a single machine, which includes a microprocessor (or other type of controller) and a memory.

The processor 26 and memory 27 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Figure 2:
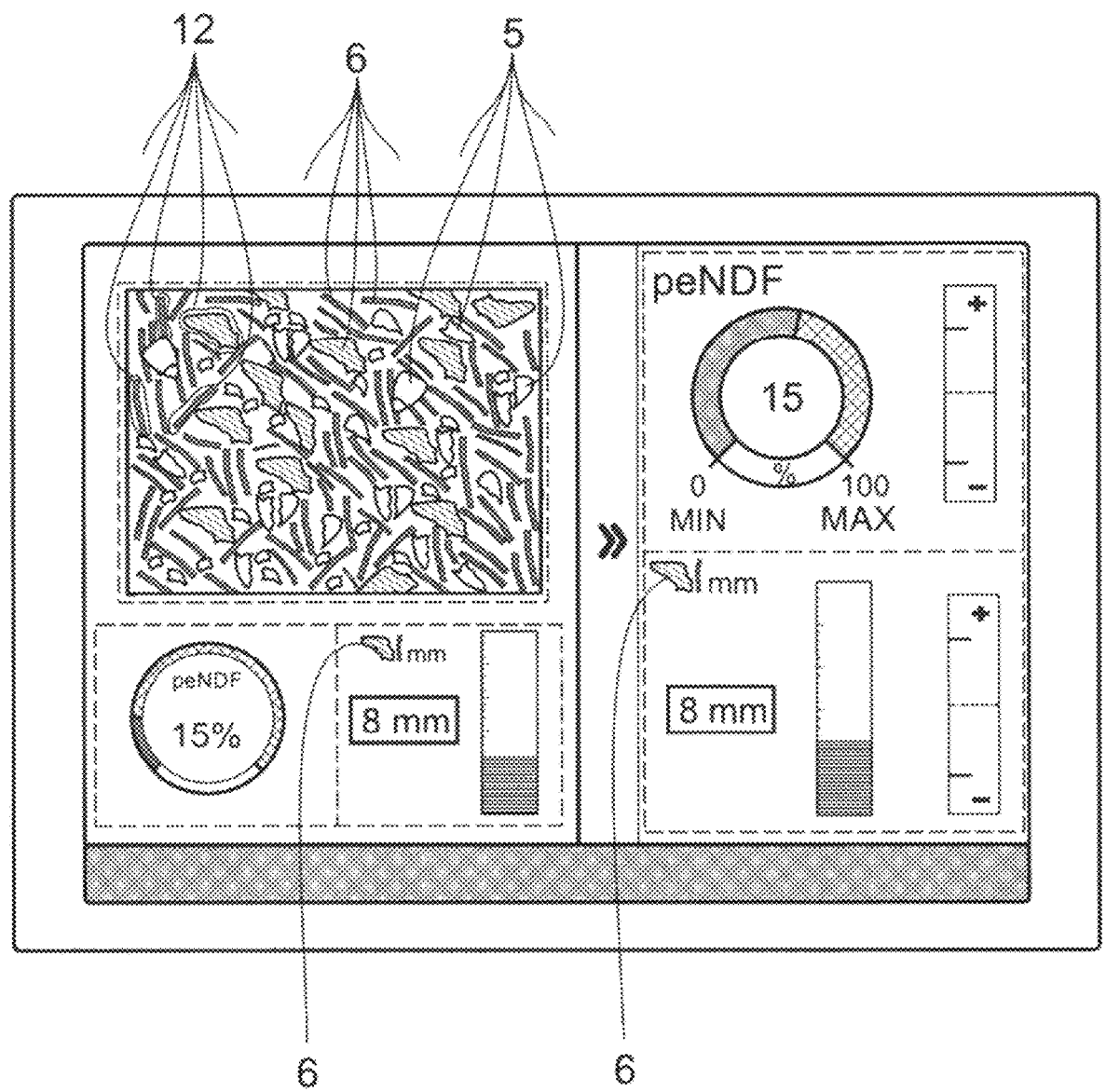
FIG. 2 shows a possible user interface for interacting with the control assembly.

The image recognition algorithm, which may be executed by the processor 26, may be any image recognition algorithm suitable for the disclosed task. For example, the image recognition algorithm may perform any one, any combination, or all of the following: preparation steps; edge recognition; color recognition; more complex element recognition algorithms; and the like. The image regions 12 determined in this manner may correspond with the images of the non-grain components 6 in the image data. Alternatively, or in addition, the image regions 12 may, for example, partially include gaps between the non-grain components 6, or be otherwise selected. Correspondingly, the image regions 12 in FIG. 2 are only selected as examples.

In one or some embodiments, the control assembly 9 is configured to determine geometric properties of the assigned non-grain components 6 in the image recognition routine based on the particular image regions 12. Examples of geometric properties are discussed further below. One example of geometric properties may be, for example, a contour of a non-grain component 6.

In the image recognition routine, the control assembly 9 is configured to determine an indicator of a structural percentage of the harvested material 4 from the geometric properties according to predetermined calculation instructions. In this case, the control assembly 9 is configured to determine the geometric properties in the image regions 12, such as by measuring the image regions 12.

In one or some embodiments, all or substantially all grain components 5 and non-grain components 6 are recognized in the image data during the image recognition routine, and the calculation instructions include determining a percentage of predetermined non-grain components 6 in the harvested material 4. This percentage may form the indicator of the structural percentage. The predetermined non-grain components 6 may be non-grain components 6 of a particular type, such as stems or leaves, and size that were determined by using the image recognition algorithm.

In the following, first the optical measuring system 10 is explained. In one or some embodiments, the camera 11 is a multi-spectral camera. In one or some embodiments, the multi-spectral camera records light from at least three distinguishable wavelength ranges, such as at least four distinguishable wavelength ranges, or such as at least five distinguishable wavelength ranges. In addition or alternatively, the multi-spectral camera may record light from at most 15 distinguishable wavelength ranges, from at most ten distinguishable wavelength ranges, or from at most eight distinguishable wavelength ranges.

Alternatively, the camera 11 is a hyperspectral camera. In one or some embodiments, the hyperspectral camera records light from at least 50 distinguishable wavelength ranges, from at least 80 distinguishable wavelength ranges, or from at least 150 distinguishable wavelength ranges.

Both a multi-spectral camera as well as a hyperspectral camera are distinguished in that they each have spatial and spectral resolution. Recording along the spectrum or spatial recording may either occur simultaneously or sequentially. distinguishable wavelength ranges the spatial and the spectral recording are simultaneous. The multi-spectral camera and the hyperspectral camera accordingly may differ physically on the one hand by their structure, and on the other hand conceptually by the amount of recordable distinguishable wavelength ranges. The term "distinguishable wavelength ranges" refers to the fact that light from the distinguishable wavelength ranges is still distinguishable in the recorded image data.

Both the multi-spectral camera and the hyperspectral camera may possess spatial resolution for each spectral range. Various techniques may be used for this. One option is a diffraction grating. Alternatively, the multi-spectral camera may be equipped with filter elements, such as a Bayer pattern. Then, the multi-spectral camera has flat sensor elements that depict a spatial resolution and simultaneously are covered matrix-like with a pattern of filter elements that assigns different wavelength ranges to adjacent sensor elements. Strictly speaking, only one wavelength range then exists per pixel. By combining picture elements into a single pixel that approximately depicts the same local point, this setup may nevertheless be added to the multi-spectral camera.

In one or some embodiments, the multi-spectral camera records at least one wavelength range of invisible light. As may be seen, a broad definition of an optical system is used in the present case that may include more than just the visible wavelength range. Given the definitions of the visible wavelength range that sometimes differ slightly from each other, in one or some embodiments, visible light comprises a wavelength range between 380 nm and 780 nm.

In one or some embodiments, the camera 11, such as the multi-spectral camera, records visible light (as visible light image data) and infrared light (as infrared light image data), such as near infrared light, from different wavelength ranges. In one or some embodiments, the camera 11 records at least one red, and/or at least one green, and/or at least one blue wavelength range. Moreover, the camera 11 may record near infrared light from at least one, such as at least two, distinguishable wavelength ranges from the range up to 1100 nm.

The optical measuring system 10 depicted in FIG. 1 may also have an optical system in addition to the camera 11. Here, this optical system may include a mirror 13 and a lens 14. Moreover, the optical measuring system 10 may include a light source 15. FIG. 1 also shows that the camera 11 has a field of vision 16 in which it may detect light from the harvested material 4. The image of the harvested material 4 shown in FIG. 2 correspondingly originates from this field of vision 16. In this case as in FIG. 1, reflection is measured. Alternately or in addition, measurement of transmission may be provided.

In an alternative embodiment, the camera 11 may be a camera that records visible light, such as an RGB camera. The optical measuring system 10 may then also have an IR camera that records infrared light, such as an NIR camera that records near infrared light, for recording IR image data of the harvested material 4 in a section of the harvested material flow 7. The image data may then be RGB image data, and the optical measuring system 10 may record IR image data of the harvested material 4 in the measuring routine by means of the IR camera, and may determine the indicator for the structural percentage from the RGB image data and the IR image data in the image recognition routine. This may be implemented in that the mirror 13 is a semitransparent mirror. In one or some embodiments, the IR camera is arranged or positioned behind the semitransparent mirror.

In the embodiment in which an IR camera is used as the additional camera, the IR camera may also have a field of vision. The field of vision 16 of the camera 11 and the field of vision of the IR camera may at least partly overlap each other, such as by at least 50%, such as by 100% or nearly 100%. It is therefore contemplated to locally assign the image data and the IR image data to each other.

In one or some embodiments, the camera 11 and/or the IR camera may have basically only optical sensor elements based on silicon, or based on indium-gallium-arsenide. The sensor elements based on silicon are more economical but are more restricted with respect to the recordable wavelength range.

In one or some embodiments, the image recognition algorithm is based on machine learning, such as deep learning (e.g., on training the algorithm by using reference data or feedback). In one or some embodiments, types of different non-grain components 6 may be separated, segregated, or identified using the image recognition algorithm. In the context of the calculation instructions, the different non-grain components 6 may be treated differently. In one or some embodiments, the different non-grain components 6 may each be multiplied by a correction parameter and may be added in order to approximately depict their neutral detergent fiber components.

In one or some embodiments, the geometric properties may include geometric dimensions of the non-grain components 6. The geometric dimensions may include any one, any combination, or all of: a shortest side length; a greatest side length; or a cross-sectional area. Accordingly, in one or some embodiments, only non-grain components 6 with a minimum cross sectional area may be considered structurally effective and may be considered an indicator of the structural percentage.

In one or some embodiments, the indicator of the structural percentage may depict a percentage of non-grain components 6 with predetermined geometric properties of the harvested material 4 or the non-grain components 6, and the calculation instructions may include a formation of the percentage. In one or some embodiments, the percentage is that of non-grain components 6 with a predetermined minimum cross-sectional area. In one or some embodiments, the indicator of the structural percentage depicts a percentage of predetermined non-grain components 6, recognized using the image recognition algorithm, with predetermined geometric properties of the harvested material 4 or the non-grain components 6. The predetermined, recognized non-grain components 6 may be certain types of non-grain components 6, such as stems or leaves.

The work assemblies 2 of the forage harvester 1 may at least be partially adjustable using machine parameters. In the following, some of the contemplated available work assemblies 2 of a forage harvester 1 are discussed further.

As a work assembly 2, the forage harvester 1 may include an attachment 17 generating harvested material flow 7 for picking up the crop 3. The collecting may comprise harvesting. In addition or alternatively, the forage harvester 1 may have a pre-pressing roller 18 as a work assembly 2 arranged or positioned in the harvested material flow 7 with a rotational speed through which a chaff length of the harvested material 4 may be adjusted. In addition or alternately, the forage harvester 1 may have a cutterhead 19 as a work assembly 2 that is arranged or positioned in the harvested material flow 7 for chopping the harvested material 4. Since the cutterhead 19 is frequently coupled directly to a motor 20 of the forage harvester 1, the chaff length may be substantially adjustable only via the pre-pressing roller 18 without changing the motor rotational speed. Other arrangements are however also contemplated. Correspondingly, it may also be provided that the chaff length is only secondarily adjustable via the pre-pressing roller 18. In this regard, another contemplated machine parameter comprises adjusting operation of the pre-pressing roller 18.

Moreover, the forage harvester 1 may have a corn cracker 21 as a work assembly 2 arranged or positioned in the harvested material flow 7. The corn cracker 21 may have two rollers 22 that rotate during operation with an adjustable rotational speed as a machine parameter. This rotational speed may also be directly coupled to the motor 20. The harvested material flow 7 may run through a gap 23 with a gap width between the rollers 22 that is adjustable as a machine parameter. The rollers 22 may have a differential rotational speed that may be adjusted as a machine parameter by which the rotational speed of the rollers 22 differs. The cutterhead 19 chops up the harvested material 4, and the corn cracker 21 breaks up the grain components 5 and shreds the non-grain components 6. In one or some embodiments, the corn cracker 21 may be deactivated.

The camera 11 and/or the IR camera may be arranged or positioned along the harvested material transport path 8 behind the corn cracker 21. In this case, the camera 11 is arranged or positioned on a discharge chute 24 of the forage harvester 1.

In one or some embodiments, the indicator of the structural percentage may be displayed to a user B. This display may be on a terminal 25 of the forage harvest 1. In one or some embodiments, the user B of the control assembly 9 may specify any one, any combination, or all of a minimum value; maximum value; or a value to be achieved for the indicator of the structural percentage, and the system may, responsive to the input from the user B, thereby adapt the calculation instructions.

In one or some embodiments, based on the indicator of the structural percentage, the control assembly 9 may adjust, such as optimally adjust, one or more machine parameters, such as machine parameter(s) that influence or affect the structural percentage, of the forage harvester 1 (e.g., adjust the speed of the pre-pressing roller 18) in order to modify the indicator of the structural percentage, such as to fulfill the optimization goal relating to the indicator of the structural percentage. This optimization goal may, for example, be the minimum or maximum value or value to be achieved that is specified by the user B. The optimization goal may also include reduced fuel consumption or the like. In one or some embodiments, the optimally adjusted machine parameter is any one, any combination, or all of: the rotational speed of the pre-pressing roller 18 (e.g., an adjustable rotational speed of the pre-pressing roller 18); the gap width of the corn cracker 21 (e.g., an adjustable gap width of the corn cracker 21); the differential rotational speed of the corn cracker 21 (e.g., an adjustable differential rotational speed at which the rotational speeds of the rollers 22 differ); or the rotational speed of the rollers 22 of the corn cracker 21 (e.g., an adjustable rotational speed of the rollers 22 of the corn cracker 21). The adjustment may be performed directly on the listed part or may be performed indirectly by setting another machine parameter such as the rotational speed of the motor 20 (which may, in turn, adjust another part).

In one or some embodiments, the optimization goal may be a predetermined structural percentage and/or a predetermined, such as minimum, fuel consumption. In one or some embodiments, the predetermined structural percentage may comprise a structural percentage of at least 14.8% and at most 18% of non-grain components 6 with a non-strainable cross-section of 8 mm. The non-strainable cross-section is to be understood as such a cross-section that is at least large enough for the corresponding non-grain component 6 to not fall through a sieve with square openings having an 8 mm side length. It is noted that, given the two-dimensional nature of the camera 11, not all side lengths of a non-grain component 6 may be available. Corresponding assumptions may therefore be made.

In one or some embodiments, the control assembly 9 is configured to automatically regulate (such as adjust) the one or more machine parameters to modify operation, such as to reach the optimization goal. In one or some embodiments, the term "regulate" relates to combining control and feedback to form a control loop.

In one or some embodiments, the control assembly 9 adjusts different settings of the machine parameter(s) successively in an optimization routine in order to determine a dependency between the machine parameter and the indicator of the structural percentage, and the control assembly 9 then, based on the determined dependency, may optimally regulate the machine parameter automatically with respect to the optimization goal. Accordingly for example, it may be provided that the gap width of the corn cracker 21 may be intentionally varied at the beginning of a harvesting process in order to determine the gap width at which the structural percentage falls outside of the set limits.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Forage harvester
2 Work assembly

3 Crop
4 Harvested material
5 Grain components
6 Non-grain components
7 Harvested material flow
8 Harvested material
9 Control assembly
10 Optical measuring system
11 Camera
12 Image regions
13 Mirror
14 Lens
15 Light source
16 Field of vision
17 Attachment
18 Pre-pressing roller
19 Cutterhead
20 Motor
21 Corn cracker
22 Roller of the corn cracker
23 Gap of the corn cracker
24 Discharge chute
25 Terminal
26 Processor
27 Memory
B User

What is claimed is:

1. A forage harvester comprising:
at least one work assembly configured to perform one or both of harvesting a crop or processing harvested material of the crop, wherein the harvested material includes grain components and non-grain components;
a harvested material transport path through at least a part of the forage harvester, wherein the harvested material is transported in a harvested material flow along the harvested material transport path; and
a control assembly comprising an optical measuring system positioned on at least a part of the harvested material transport path;
wherein the optical measuring system includes at least one camera configured to record image data of the harvested material of the harvested material flow;
wherein the control assembly is configured to:
determine, using an image recognition algorithm, one or more image regions assigned to a non-grain component in the image data;
determine, based on the one or more image regions and using one or more geometric properties of the assigned non-grain components, a subpart of the non-grain components, wherein the subpart of the non-grain components is less than an entirety of the non-grain components; and
determine, based on the subpart of the non-grain components, an indicator of a structural percentage of the harvested material.

2. The forage harvester of claim 1, wherein the camera comprises a multi-spectral camera configured to record light from at least three distinguishable wavelength ranges in order to generate the image data; and
wherein the control assembly is configured to determine the one or more image regions based on the recorded light from the at least three distinguishable wavelength ranges.

3. The forage harvester of claim 2, wherein the multi-spectral camera is configured to record visible light and infrared light from different wavelength ranges; and
wherein at least one of the different wavelength ranges comprises at least one red wavelength range, at least one green wavelength range, or at least one blue wavelength range.

4. The forage harvester of claim 1, wherein the image recognition algorithm is based on machine learning in order to determine both a particular type as a subset of a plurality of types of the non-grain components and a particular size as a subset of sizes of the non-grain components.

5. The forage harvester of claim 1, further comprising a sieve with openings;
wherein the geometric properties include geometric dimensions of the non-grain components comprising one or more of a shortest side length, a greatest side length, or a cross-sectional area selected based on one or more dimensions of the openings of the sieve; and
wherein the subpart of the non-grain components, identified based on the one or more of the shortest side length, the greatest side length, or the cross-sectional area, are greater than the openings of the sieve.

6. The forage harvester of claim 1, further comprising a sieve with openings;
wherein the geometric properties include geometric dimensions of the non-grain components comprising each of a shortest side length, a greatest side length, and a cross-sectional area selected based on one or more dimensions of the openings of the sieve; and
wherein the subpart of the non-grain components, identified based on the one or more of the shortest side length, the greatest side length, or the cross-sectional area, are greater than the openings of the sieve.

7. The forage harvester of claim 1, wherein the control assembly is configured to determine the subpart of the non-grain components by using one or both of a particular size as a subset of sizes of the non-grain components or a particular type as a subset of a plurality of types of the non-grain components in order to determine the subpart of the non-grain components that is less than an entirety of the non-grain components;
wherein at least a part of the forage harvester is at least partly adjustable via one or more machine parameters; and
wherein the control assembly is further configured, based on the indicator of the structural percentage of the harvested material, to adjust the one or more machine parameters in order to modify a percentage in the harvested material of the one or both of the particular size of the non-grain components or the particular type of the non-grain components.

8. The forage harvester of claim 7, wherein the forage harvester includes one or both of:
a pre-pressing roller as a work assembly positioned in the harvested material flow with a rotational speed through which a chaff length of the harvested material is adjusted; and
a cutterhead as a work assembly that is positioned in the harvested material flow for chopping the harvested material, wherein operation of the cutterhead is modified based on a change in the rotational speed of the pre-pressing roller; and
wherein the control assembly, based on the indicator of the structural percentage of the harvested material, is configured to adjust the rotational speed of the pre-pressing roller in order to modify the percentage in the harvested material of the one or both of the particular size of the non-grain components or the particular type of the non-grain components.

9. The forage harvester of claim 7, wherein the forage harvester includes a corn cracker as a work assembly positioned in the harvested material flow;
- wherein the corn cracker has two rollers configured to rotate during operation with an adjustable rotational speed of the two rollers;
- wherein the two rollers are configured to have an adjustable differential rotational speed at which the rotational speeds of the two rollers differ;
- wherein the harvested material flow is configured to run through a gap with an adjustable gap width between the rollers; and
- wherein the control assembly, based on the indicator of the structural percentage of the harvested material, is configured to adjust one or more of the adjustable rotational speed of the two rollers, the adjustable differential rotational speed at which the rotational speeds of the two rollers differ, or the adjustable gap width in order to modify the percentage in the harvested material of the one or both of the particular size of the non-grain components or the particular type of the non-grain components.

10. The forage harvester of claim 1, wherein the control assembly is configured to determine the subpart of the non-grain components by using one or both of a particular size as a subset of sizes of the non-grain components or a particular type as a subset of a plurality of types of the non-grain components in order to determine the subpart of the non-grain components that is less than an entirety of the non-grain components; and
- wherein the control assembly is further configured to:
  - cause the indicator of the structural percentage to be displayed to a user;
  - receive, from the user, input indicative of at least one of a minimum value for the indicator of the structural percentage, a maximum value for the indicator of the structural percentage, or a value to be achieved for the indicator of the structural percentage; and
  - compare the determined indicator of the structural percentage of the harvested material with the input received from the user; and
  - control, based on the comparison of the determined indicator of the structural percentage of the harvested material with the input received from the user, at least a part of the forage harvester in order to modify a percentage in the harvested material of the one or both of the particular size of the non-grain components or the particular type of the non-grain components.

11. The forage harvester of claim 1, wherein the control assembly is configured to determine the subpart of the non-grain components by using one or both of a particular size as a subset of sizes of the non-grain components or a particular type as a subset of a plurality of types of the non-grain components in order to determine the subpart of the non-grain components that is less than an entirety of the non-grain components; and
- wherein the control assembly is further configured to:
  - based on the indicator of the structural percentage and an optimization goal, adjust one or more machine parameters that affect the structural percentage in order to modify a percentage in the harvested material of the one or both of the particular size of the non-grain components or the particular type of the non-grain components.

12. The forage harvester of claim 11, wherein the one or more machine parameters comprises one or more of: a rotational speed of a pre-pressing roller; a gap width of a corn cracker; a differential rotational speed of rollers of the corn cracker; or rotational speed of the rollers of the corn cracker;
- wherein the optimization goal comprises one or both of a predetermined structural percentage or a predetermined fuel consumption; and
- wherein the control assembly is further configured to:
  - adjusting different settings of the one or more machine parameters and determining the indicators of the structural percentage responsive to the adjusting different settings of the one or more machine parameters; and
  - determining, based on adjusting different settings of the one or more machine parameters and the determined indicators of the structural percentage responsive to the adjusting different settings of the one or more machine parameters, a dependency between the one or more machine parameters and the indicator of the structural percentage; and
- wherein the control assembly is configured to adjust the one or more machine parameters that affect the structural percentage by:
  - based on the determined dependency, automatically regulating the one or more machine parameters with respect to the optimization goal.

13. The forage harvester of claim 1, further comprising at least one sieve with openings through which the non-grain components are sifted;
- wherein the control assembly is configured to determine the subpart of the non-grain components by using a particular size as a subset of sizes of the non-grain components in order to determine the subpart of the non-grain components that is less than an entirety of the non-grain components; and
- wherein the particular size comprises the non-grain components with at least a minimum cross sectional area that is greater than the openings of the at least one sieve.

14. The forage harvester of claim 1, wherein the control assembly is configured to determine the subpart of the non-grain components by using a particular type as a subset of a plurality of types of the non-grain components in order to determine the subpart of the non-grain components that is less than an entirety of the non-grain components.

15. The forage harvester of claim 14, wherein the control assembly is configured to separate, segment or identify, using an image recognition algorithm, the plurality of types of the non-grain components in order to treat different types of the plurality of types differently.

16. The forage harvester of claim 1, wherein the control assembly is configured to determine the subpart of the non-grain components by using both of a particular type as a subset of a plurality of types of the non-grain components and a particular size as a subset of sizes of the non-grain components in order to determine the subpart of the non-grain components that is less than an entirety of the non-grain components.

17. The forage harvester of claim 16, wherein the particular type comprises stems or leaves.

18. The forage harvester of claim 16, further comprising a sieve with openings through which the non-grain components are sifted;
- wherein the control assembly is configured to determine the subpart of the non-grain components by using the particular size as the subset of sizes of the non-grain components in order to determine the subpart of the non-grain components that is less than an entirety of the non-grain components; and wherein the particular size comprises the non-grain components with at least a minimum cross sectional area that is greater than the openings of the sieve.

19. The forage harvester of claim 16, wherein the structural percentage comprises a percentage of the non-grain components with the particular type and the particular size with the non-grain components of the plurality of types and regardless of size.

20. The forage harvester of claim 16, wherein the structural percentage comprises a percentage of the non-grain components with the particular type and the particular size with the grain components.

* * * * *